United States Patent [19]

Corcoran

[11] Patent Number: 4,816,500

[45] Date of Patent: Mar. 28, 1989

[54] TWO COMPONENT COATING COMPOSITION OF AN ANHYDRIDE CONTAINING POLYMER AND A GLYCIDYL COMPONENT

[75] Inventor: Patrick H. Corcoran, Cherry Hill, N.J.

[73] Assignee: E. I. Du Pont de Nemours and Company, Wilmington, Del.

[21] Appl. No.: 51,867

[22] Filed: May 20, 1987

Related U.S. Application Data

[63] Continuation-in-part of Ser. No. 802,154, Nov. 25, 1985, abandoned.

[51] Int. Cl.$^4$ .......................... C08K 5/01; C08K 5/10; C08L 63/02
[52] U.S. Cl. ...................... 523/400; 523/437; 525/117; 525/119; 525/207; 525/208; 525/221
[58] Field of Search ............... 525/117, 119, 207, 208, 525/221; 523/400, 437

[56] References Cited

U.S. PATENT DOCUMENTS

| | | | |
|---|---|---|---|
| 3,509,086 | 4/1970 | Rohrbacher, Jr. | 525/117 |
| 3,803,111 | 4/1974 | Munro et al. | 525/117 |
| 4,038,454 | 7/1977 | Lehmann et al. | 525/117 |
| 4,042,645 | 8/1977 | Hirota et al. | 525/117 |
| 4,452,948 | 6/1984 | Marrion et al. | 525/207 |
| 4,507,411 | 5/1985 | Gordon et al. | 523/436 |
| 4,548,963 | 10/1985 | Cluff et al. | 525/117 |

FOREIGN PATENT DOCUMENTS

| | | | |
|---|---|---|---|
| 0123793 | 11/1984 | European Pat. Off. | |
| 59-98169 | 6/1984 | Japan | 525/117 |

*Primary Examiner*—Lewis T. Jacobs
*Assistant Examiner*—Robert E. L. Sellers, II
*Attorney, Agent, or Firm*—Hilmar L. Fricke

[57] ABSTRACT

A coating composition useful for a finish for automobiles and trucks in which the film forming binder contains two reactive binder components of about (a) 50–95% by weight, based on the weight of the binder, of an acrylic polymer having at least two reactive anhydride groups composed of polymerized monomers of an ethylenically unsaturated anhydride and polymerized monomers from the group consisting of alkyl methacrylate, alkyl acrylate and any mixtures thereof, wherein the alkyl groups have 1–8 carbon atoms and the polymer has a weight average molecular weight of about 2,000–50,000;

(b) 5–50% by weight, based on the weight of the binder, of a glycidyl component having at least two reactive glycidyl groups; and the composition contains about 0.1–5% by weight, based on the weight of the binder, of a catalyst; and wherein the composition upon curing forms a hard, glossy and tack free finish.

18 Claims, No Drawings

TWO COMPONENT COATING COMPOSITION OF AN ANHYDRIDE CONTAINING POLYMER AND A GLYCIDYL COMPONENT

CROSS-REFERENCE TO RELATED APPLICATIONS

This application is a continuation-in-part of Ser. No. 802,154 filed Nov. 25, 1985, now abandoned.

BACKGROUND OF THE INVENTION

This invention is related to a two component coating composition.

There are a wide variety of two component coating compositions available for finishing substrates. Typically with these compositions, the components are mixed together before application and then the resulting composition is applied by conventional techniques such as spraying and the composition is cured at ambient temperatures or can be cured at elevated temperatures. These compositions are used to refinish automobiles and trucks, paint structures such as bridges and buildings, paint appliances, metal cabinets and the like.

Representative of such compositions are shown in the following patents:

Marion et al. U.S. Pat. No. 4,452,948 issued June 5, 1984. A two component composition is taught in which one component has at least two free hydroxyl groups and a second component has anhydride groups. However, these compositions have a short "pot life" which is the useable time in which the composition can be applied by conventional means such as spraying. Finishes formed from such a composition generally are have poor solvent resistance and are sensitive to moisture. Under high humidity conditions which are common for automobiles and trucks finishes whiten and blister.

Gordon et al. U.S. Pat. No. 4,507,411, issued Mar. 26, 1985 shows a two component composition of a functionalized polymeric component and glycidyl component that in the presence of an amine, alcohol, ketimine, acetal or oxazolidine cures at ambient temperatures. However, the compositions disclosed are not useful for finishes for automobiles and trucks.

European patent application No. 0,123,793 shows a two component composition in which one component has an anhydride ring that is opened with an amine and has a second component that contains glycidyl groups. Finishes formed from such compositions are not useful for automobiles and trucks since the finishes whiten and blister on exposure to high humidity conditions and exhibit recoat lifting when repaired within several days after the finish has been applied.

There is a need for a coating composition that cures at ambient temperatures and provides a high quality finish that is useful as an exterior finish or refinish for automobiles and trucks that has excellent adhesion to the substrate to which it is applied, good outdoor weatherability and humidity resistance and an excellent appearance.

SUMMARY OF THE INVENTION

A coating composition containing 20-80% by weight of reactive binder components and 80-20% by weight of an organic carrier;
the binder contains about
(a) 50-95% by weight, based on the weight of the binder, of an acrylic polymer having at least two reactive anhydride groups which consist of polymerized monomers of an ethylenically unsaturated anhydride and polymerized monomers selected from the group consisting of alkyl methacrylate, alkyl acrylate and any mixtures thereof, wherein the alkyl groups have 1-8 carbon atoms and the polymer has a weight average molecular weight of about 2,000-50,000;
(b) 5-50% by weight, based on the weight of the binder, of a glycidyl component having at least two reactive glycidyl groups; and
the composition contains about 0.1-5% by weight, based on the weight of the binder, of a catalyst; and wherein the primary reaction on curing of the composition occurs between the anhydride groups of the acrylic polymer and the glycidyl groups of the glycidyl component and wherein the composition upon curing forms a hard, glossy and tack free finish.

DETAILED DESCRIPTION OF THE INVENTION

The film forming binder of the coating composition of this invention contains components that are mixed together before application. Typically, the acrylic polymer having reactive anhydride groups in a solvent is one reactive component. The glycidyl component either with or without a solvent is the second component. The catalyst with reducing thinners for application, which usually is spray application, is a third component. These three components are provided in separate containers to a user and then mixed by the user shortly before application. The "pot-life" of the resulting composition is about 1-6 hours depending on the surrounding temperature conditions.

The composition forms an excellent clear coating over colored pigmented finishes. The coating has good adhesion to the pigmented finish, has excellent humidity resistance and is weatherable and durable. The composition is useful for finishing and refinishing the exterior of automobiles and trucks and the composition can be pigmented and form a colored finish. Also, the composition can be used over flexible substrates used in automobiles and trucks such as filler panels, side panels, fender extensions, moldings and other trim parts.

The composition also can be pigmented to form a colored finish. These pigmented compositions are particularly useful as exterior original equipment and refinish coatings for automobiles and trucks.

The composition has a film forming binder content of about 20-80% by weight in an organic carrier which usually is a solvent for the binder. A nonsolvent can be used to form a dispersion.

Preferably, the composition has a high solids content and contains about 40-70% by weight binder and 30-60% by weight of organic solvent.

The acrylic polymer of the composition has a weight average molecular weight of about 2,000-50,000 determined by gel permeation chromatography using polymethyl methacrylate as a standard and preferably, has a weight average molecular weight of 4,000-25,000.

The acrylic polymer has a glass transition temperature of at least 0° C. and preferably 10° to 70° C. The glass transition temperature for the polymer can be calculated by conventional methods.

The acrylic polymer is prepared by conventional techniques in which the monomers, solvent, and conventional catalysts such as t-butyl perbenzoate or t-butyl peracetate are charged into a polymerization vessel and heated to about 75°–200° C. for about 0.5–6 hours to form the polymer.

The acrylic polymer is formed by polymerizing monomers of alkyl methacrylates, or alkyl acrylates or mixtures thereof, where the alkyl groups have 1–8 carbon atoms and ethylenically unsaturated anhydrides. The aklyl acrylates and methacrylates are chosen such that the aforementioned glass transition temperatures can be achieved so that a polymer will be formed that provides a finish having suitable hardness and durability..

The ethylenically unsaturated anhydride provides the primary reactive component of the acrylic polymer. The acrylic polymer does not contain glycidyl groups but may contain small amounts of other reactive components such as acids like acrylic acid or methacrylic acid so long as these components do not interfere with the primary reaction between the anhydride groups of the acrylic polymer and the glycidyl groups of the glycidyl component.

Optionally, the acrylic polymer can contain other components such as styrene, acrylonitrile, methacrylonitrile in amounts of about 0.1–50% by weight.

Typical alkyl acrylates and methacrylates that can be used to form the acrylic polymer are as follows: methyl methacrylate, ethyl methacrylate, propyl methacrylate butyl methacrylate, pentyl methacrylate, hexyl methacrylate, octyl methacrylate, methyl acrylate, ethyl acrylate, propyl acrylate, butyl acrylate, octyl acrylate, and the like. Other components that can be used to form the acrylic polymer are acrylamide, methacrylamide, acrylo alkoxy silanes such as, gamma methacryloyl propyl trimethoxy silane. Also the acrylic polymer can contain about 0.1–5% by weight of an ethylenically unsaturated acid such as acrylic acid, methacrylic acid, itaconic acid, maleic acid and the like.

Up to about 40% by weight of alkyl acrylates and methacrylates having 9–12 carbon atoms in the alkyl group can be used in the acrylic polymer. If such alkyl acrylates or methacrylates are used, they preferably are used in a range of about 5–30% by weight of the acrylic polymer. Typical examples of such alkyl acrylates and methacrylates are decyl methacrylate, nonyl methacrylate, lauryl methacrylate, nonyl acrylate, decyl acrylate and lauryl acrylate.

Typically useful ethylenically unsaturated anhydrides are as follows: itaconic anhydride, maleic anhydride and isobutenyl succinic anhydride.

Preferred acrylic polymers contain about 20–40% by weight methyl methacrylate, styrene or mixture thereof, 35–55% by weight of an alkyl acrylate, or methacrylate having 2–4 carbon atoms in the alkyl group and 5–55% by weight of a polymerizable ethylenically unsaturated anhydride.

Particularly preferred acrylic polymers are as follows: methyl methacrylate/butyl acrylate/itaconic anhydride, butyl acrylate/styrene/ maleic anhydride/maleic acid, methyl methacrylate/butyl methacrylate/itaconic anhydride.

The glycidyl component contains at least two glycidyl groups and can be an oligomer or a polymer. Typical glycidyl components are as follows: polyglycidyl ethers of low molecular weight polyols such as sorbitol polyglycidyl ether, mannitol polyglycidyl ether, pentaerythritol polyglycidyl ether, glycerol polyglycidyl ether, low molecular weight epoxy resins having an epoxide equivalent weight of about 150–250 and a viscosity measured at 25° C. of about 500–7,000 centipoises such as epoxy resins of epichlorohydrin and bisphenol A and epichlorohydrin and bisphenol F, polyglycidyl esters of polyacids, polyglycidyl ethers of isocyanurates, such as "Denecol" EX301 from Nagase. Compatible mixtures of the above glycidyl components can used. Sorbitol polyglycidyl ether is preferred since it forms a high quality finish.

Glycidyl methacrylate or acrylate containing acrylic polymers can be used as the glycidyl component such as random and block polymers of glycidyl methacrylate/butyl methacrylate. The block polymers can be prepared by anionic polymerization or by group transfer polymerization.

Preferred glycidyl methacrylate or acrylate containing polymers that can be used contain about 30–70% by weight of glycidyl acrylate or methacrylate and 30–70% by weight of an alkyl acrylate or methacrylate having 1–12 carbons in the alkyl group and preferably 1–4 carbon atoms in the alkyl group and have a weight average molecular weight of about 2,000–20,000. One particularly preferred polymer contains about 50–70% by weight glycidyl methacrylate and 30–50% by weight butyl methacrylate and has a weight average molecular weight of about 5,000–10,000.

The ratio of glycidyl reactant groups to the anhydride reactant groups preferably is about from 1/1 to 1.5/1. Generally, a 1/1 ratio is preferred.

Typical solvents used to prepare the acrylic polymer and used as a diluent for the coating composition are as follows: toluene, xylene, butyl acetate, ethyl benzene, higher boiling aromatic hydrocarbons, amyl acetate, ethyl acetate, propyl acetate, ethylene or propylene glycol mono alkyl ether acetates.

About 0.01–5% by weight, based on the weight of the binder of the coating composition, of a catalyst is added to enhance curing of the composition. Typical catalysts are as follows: triethylene diamine, dialkyl alkanol amines such as dimethyl ethanolamine, diethyl ethanol amine, dibutyl ethanol amine, diethyl hexanol amine and the like, lithium tertiary butoxide, tri(dimethylaminomethyl)-phenol, bis(dimethylamino)propan-2-ol, N,N,N$^1$,N$^1$-tetramethylethylenediamine, N,methyldiethanolamine, N,N-dimethyl-1,3-propanediamine and 1-dimethylamino-2-propanol.

Generally, the composition is applied by conventional techniques such as spraying and electrostatic spraying. The resulting coating can be dried and cured at ambient temperatures of about 20°–30° C. or can be cured at elevated temperatures of 60° to 200° C. At ambient temperatures, the coating dries to a tack free condition in about 180 minutes and in about 24 hours the coating is substantially cured. In about 5–7 days, the coating is completely cured. Coatings are applied to form a finish about 0.5–5 mils thick, and preferably 1–2 mils thick. The finish has excellent gloss, good adhesion to substrate and excellent weatherability.

To improve weatherability of the clear finish of the coating composition, about 0.1–5%, by weight, based on the weight of the binder, of an ultraviolet light stabilizer or a combination of ultraviolet light stabilizers can be added. These stabilizers include ultraviolet light absorbers, screeners, quenchers and specific hindered amine light stabilizers. Also, about 0.1–5% by weight, based on the weight of the binder, of an antioxidant can be added.

Typical ultraviolet light stabilizers that are useful are as follows:

Benzophenones such as hydroxydodecyclbenzophenone, 2,4-dihydroxybenzophenone, hydroxy-benzophenones containing sulfonic acid groups, 2,4-dihydroxy-3',5'-di-t-butylbenzophenone, 2,2',4'-trihydroxybenzophenone esters of dicarboxylic acids, 2-hydroxy-4-acryloxyethoxybenzophenone, aliphatic mono-esters of 2,2',4-trihydroxy-4'-alkoxybenzophenone, 2-hydroxy-4-methoxy-2'-carboxybenzophenone;

Triazoles such as 2-phenyl-4-(2'-4-dihydroxybenzoyl)triazoles, substituted benzotriazoles such as hydroxyphenyltriazoles such as 2-(2'hydroxy-5'-methyphenyl) benzotriazole, 2-(2'hydroxyphenyl)benzotriazole, 2-(2'-hydroxy-5'-octylphenyl)naphthotriazole;

Triazines such as 3,5-dialkyl-4-hydroxyphenyl derivatives of triazine, sulfur-containing derivatives of dialkyl-4-hydroxyphenyltriazines, hydroxyphenyl-1,3,5-triazines and such triazines containing sulfonic acid groups, aryl-1,3,5-triazines, orthohydroxyaryl-s-triazine;

Benzoates such as dibenzoate of diphenylolpropane, t-butyl benzoate of diphenylolpropane, nonyl phenyl benzoate, octyl phenyl benzoate, resorcinol dibenzoate.

Other ultraviolet light stabilizers that can be used include lower alkyl thiomethylene-containing phenols, substituted benzenes such as 1,3-bis(2'-hydroxybenzoyl)benzene, metal derivatives of 3,5,-di-t-butyl-4-hydroxyphenylpropionic acid, asymmetrical oxalic acid diarylamides, alkylhydroxyphenylthioalkanoic acid esters, dialkylhydroxyphenylalkanoic acid esters of di- and tri- pentaerythritol, phenyl- and naphthlenesubstituted oxalic acid diamides, methyl-beta-(3,5-di-t-butyl-4-hydroxyphenyl)propionate, alpha,alpha'-bis(2-hydroxy-phenyl)diisopropylbenzene, 3,5'-dibromo-2'-hydroxy-acetophenone, ester derivatives of 4,4-bis(4'-hydroxy-phenyl)pentaonic acid wherein there is at least one unsubstituted position ortho to the aromatic hydroxyl groups, organophosphorus sulfides such as bis(-diphenylphosphinothioyl)monosulfide and bis(diphenyl-phosphinothioyl)disulfide, 4-benzoyl-6-(dialkylhydroxybenzyl)resorcinol, bis(3-hydroxy-4-benzoylphenoxy)diphenylsilane, bis(3-hydroxy-4-benzoylphenoxy)dialkylsilane, 1,8-naphthalimides, alphacyano-beta,beta-diphenylacrylic acid derivatives, bis(2-benzoxazolyl)alkanes, bis(2-naphthoxazolyl)alkanes, methylene malonitriles containing aryl and heterocyclic substitutes, alkylenebis(dithio)carbamate, 4-benzoyl-3-hydroxyphenoxyethyl acrylate, 4-benzoyl-3-hydroxyphenoxyethyl methacrylate, aryl or alkyl-substituted acrylonitriles, 3-methyl-5-isopro-pylphenyl-6-hydroxycourmarone, 8-acetyl-3-dodecyl-7,7,9,9-tetramethyl-1,3,8-triazaspiro(4,5)decanol-2,4-dione.

Particularly useful ultraviolet light stabilizers that can be used are hindered amines of piperidyl derivatives such as those disclosed in Murayama et al., U.S. Pat. No. 4,061,616, issued Dec. 6, 1977, column 2, line 65, through column 4, line 2, and nickel compounds such as [1-phenyl-3-methyl-4-decanoylpyrazolate(5)]-Ni, bis[-phenyldithiocarbamato]-Ni(II), and others listed in the above Patent, column 8, line 44 through line 55.

The following blend of ultraviolet light stabilizers can be used:2-[2'-hydroxy-3',5'-1(1-1-dimethyl-propyl)-phenyl]benzotriazole and bis-[4-(1,2,2,6,6-pentamethyl-piperidyl)] 2-butyl-2-[(3,5-t-butyl-4-hydroxyphenyl)methyl]propanedioate. The stabilizers can be used in any ratio however, a 1:1 ratio of benzotriazole to propanedioate is preferred. Another useful blend of ultraviolet light stabilizers is 2-(benzotriazole-2-VL)4,6-bis(methyl-ethyl-1-phenyl ethyl)phenol, and 2(3 hydroxy-3,5'-ditert amyl phenyl) benzotriazole.

Generally, when the coating composition of this invention is used as a clear coating, it is applied by conventional spraying techniques, to a color or base coat of an automobile or truck, preferably, electrostatic spraying is used. In an assembly operation, the clear coating usually is applied before the color coat is baked. The coatings are baked at about 110° to 230° C. for about 20 to 40 minutes. In refinishing automobiles and trucks, the clear coating is applied to a color coat and then can be dried at ambient temperatures or baked to form a clear finish. The resulting clear coat or finish is about 1–5 mils thick preferably 1–2 mils thick and has excellent gloss, good adhesion to the color cat and excellent weatherability.

The composition can be pigmented to form a colored finish. About 0.1–50% by weight, based on the weight of the binder, of conventional pigments can be added using conventional techniques in which a mill base containing pigment, dispersant and solvent is first formed. The mill base is then mixed with the composition to form a colored composition. This composition can be applied and cured as shown above.

The following examples illustrate the invention. All parts and percentages are on a weight basis unless indicated otherwise. Molecular weights are determined by gel permeation chromatography using polymethyl methacrylate as the standard.

EXAMPLE 1

The following constituents were charged into a reactor equipped with a thermometer, stirrer, dropping funnel, nitrogen induction tube and condenser:

|  | Parts By Weight |
|---|---|
| Portion 1 | |
| Xylene | 837.0 |
| Portion 2 | |
| Methylmethacrylate monomer | 585.6 |
| Butylacrylate monomer | 878.4 |
| Itaconic anhydride monomer | 488.0 |
| Portion 3 | |
| t-butyl peracetate | 94.0 |
| Portion 4 | |
| t-butyl perbacetate | 20.0 |
| xylene | 100.0 |
| Total | 3003.0 |

Portion 1 was charged into the reactor, covered with nitrogen and heated to its reflux temperature. Portion 2 was premixed and warmed to 45#C. and portions 2 and 3 were added simultaneously and dropwise to the reactor over a 150 minute period while holding the contents of the reactor at reflux temperatures. Portion 4 was premixed and added over a 30 minute period and then the resulting composition was held at its reflux temperature for an additional hour.

The resulting polymer composition had a weight solids content of 69% and the polymer had a Gardner Holdt Viscosity of Z-1. The polymer had a weight average molecular weight of 4500 and contained 30% methyl methacrylate, 45% butyl acrylate and 25% itaconic anhydride.

Coating composition was prepared by thoroughly blending together the following constituents:

| Portion 1 | Parts By Weight |
| --- | --- |
| Polymer Composition (prepared above) | 43.7 |
| Denecol ® Ex622 (Sorbitol polyglycidyl ether) | 14.3 |
| DABCO ® (triethylene diamine) | 0.9 |
| Butyl acetate | 41.1 |
| Total | 100.0 |

The resulting coating composition had a solids content of 45% and a viscosity of 18 seconds measured with a No. 2 Zahn Cup.

The coating composition was sprayed onto a primed metal panel coated with a pigmented acrylic lacquer. The composition cured at ambient temperature and provided a clear coat with excellent hardness and adhesion to the lacquer layer.

After 24 hours curing at an ambient temperature, a 3 mil thick film of the pigmented acrylic lacquer was applied over the clear coat. No wrinkling or adhesion loss was noted indicating that the clear coat was fully cured in 24 hours.

Panels as described above were spray coated with the above composition under ambient temperatures and at a constant 60% relative humidity. The composition was cured at ambient temperatures and after 7 days the resulting clear finish withstood 200 double rubs with methylethyl ketone and withstood four days in a humidity cabinet maintained at 38° C. and 100% relative humidity without blistering or whitening of the finish or loss of adhesion of the finish.

A second coating composition was prepared by thoroughly blending together the following constituents:

| Portion 1 | Parts By Weight |
| --- | --- |
| Polymer composition (prepared above) | 341.15 |
| Denecol ® Ex622 (described above) | 114.14 |
| DABCO ® (triethylene diamine) | 3.53 |
| Dimethylethanolamine | 3.53 |
| Butyl acetate | 337.65 |
| Total | 800.00 |

The resulting coating composition had a solids content of 45% and a viscosity of about 18 seconds measured with a No. 2 Zahn cup.

A 2 mil thick coating of the composition was applied to a glass substrate and cured at ambient temperatures. After 1 day, the Persoz hardness was 250 counts and the film withstood 200 double rubs with methylethyl ketone indicating the coating was fully cured.

The coating composition was sprayed onto primed metal panels coated with a while acrylic lacquer. The composition cured at ambient temperatures for 24 hours and no discoloration was noted and adhesion and hardness of the resulting finish excellent. After curing for seven days, the finish withstood four days in a humidity cabinet maintained at 38° C. and 100% relative humidity without loss of adhesion or blistering of the finish. Also, the finish could be recoated with an acrylic lacquer without wrinkling of the finish.

The above coating composition was reformulated without using an amine or diamine. The resulting composition was sprayed onto a primed metal panel coated with an acrylic lacquer and then placed in a chamber containing dimethyl ethanol amin vapors. The panel was removed from the chamber and allowed to cure at ambient temperatures. The resulting finish was hard and glossy and humidity resistant.

EXAMPLE 2

The following constituents were charged into a reactor equipped as in Example 1:

|  | Parts By Weight |
| --- | --- |
| Portion 1 |  |
| Xylene | 450 |
| Portion 2 |  |
| Butyl acrylate monomer | 908 |
| Styrene monomer | 708 |
| Maleic anhydride | 319 |
| Maleic acid | 42 |
| Propylene glycol monomethyl ether | 450 |
| t-butyl perbenzoate | 53 |
| Portion 3 |  |
| Xylene | 269 |
| t-butyl perbenzoate | 9 |
| Total | 3208 |

Portion 1 was charged into the reactor and heated to its reflux temperature. Portion 2 was premixed and slowly added over 3 hours to the reactor while maintaining the contents of the reactor at reflux temperature. Portion 3 was mixed and slowly added to the reactor over a 45 minute period and then the resulting composition was held at its reflux temperature for an additional two hours.

The resulting polymer composition had a weight solids content of 50% and the polymer had a Gardner Holdt viscosity of V measured at 25° C. The polymer had a weight average molecular weight of 2,000 and contained 46% butyl acrylate, 36% styrene, 16% maleic anhydride and 2% maleic acid.

coating composition was prepared by thoroughly blending together the following constituents:

|  | Parts By Weight |
| --- | --- |
| Polymer composition (prepared above) | 53.20 |
| Denecol ® EX622 (described in Example 1) | 15.90 |
| DABCO (described in Example 1) | 0.85 |
| Butyl acetate | 100.05 |
| Total | 170.00 |

The resulting coating composition had a solids content of 25% and a viscosity of 18 seconds measured with a No. 2 Zahn cup.

The coating composition was sprayed onto a metal substrate and after 7 days of curing at ambient temperatures the coating had a Persoz hardness of 240, resisted over 150 double rubs with methylethyl ketone. After exposure to a humidity cabinet maintained at 38#C and 100% relative humidity, the coating did not whiten, blister or show loss of adhesion.

EXAMPLE 3

The following constituents were charged into a reactor equipped as in Example 1:

|  | Parts By Weight |
| --- | --- |
| Portion 1 | |
| Toluene | 304.00 |
| Portion 2 | |
| Glycidyl methacrylate | 293.2 |
| Butyl methacrylate | 195.5 |
| Toluene | 23.5 |
| 2.2 2-methylbutane nitrile | 23.5 |
| Portion 3 | |
| Toluene | 17.9 |
| 2.2 2-methylbutane nitrile | 2.9 |
| Total | 860.5 |

Portion 1 was heated to its reflux temperature. Portion 2 was premixed and slowly added to the reactor over a two hour period while maintaining the contents of the reactor at reflux temperature. Portion 3 was premixed and slowly added over a 20 minute period and the resulting reaction mixture was held at its reflux temperature for an additional 60 minutes.

The resulting polymer composition had a weight solids content of 56%. The polymer had a weight average molecular weight of 7,000 and contained 60% by weight glycidyl methacrylate and 40% by weight butyl methacrylate.

A coating composition was prepared by thoroughly blending together the following constituents:

|  | Parts By Weight |
| --- | --- |
| Polymer composition (Prepared in Example 1) | 0.04 |
| Polymer composition (Prepared above) | 28.67 |
| DABCO (described in Example 1) | 0.88 |
| Butyl Acetate | 30.41 |
| Total | 100.00 |

The resulting coating composition had a solids content of 45% and a viscosity of 18 seconds measured with a No. 2 Zahn cup.

Coatings were sprayed onto metal substrates and cured at ambient temperatures to form a 2 mil thick finish. After curing for 7 days at 25° C., the finishes had a Persoz hardness of 225 counts and resisted 150 double rubs with methyl ethyl ketone. The chip resistance of the finish was acceptable.

EXAMPLE 4

A coating composition was prepared by thoroughly blending together the following constituents:

|  | Parts By Weight |
| --- | --- |
| Polymer composition (prepared in Example 1) | 365.46 |
| Araldite ® CY184 (Glycidyl ester of a diacid from Ciba-Geigy Corporation) | 102.66 |
| DABCO (described in Example 1) | 3.40 |
| Dimethyl ethanol amine | 3.40 |
| Butyl acetate | 311.50 |
| Tinuvin ® 328 [2-(2hydroxy-3,5-ditertiary amyl phenol)2-H—benzotriazole] | |
| Tinuvin ® 144 (hindered amine light stabilizer) | 6.79 |
| Total | 800.00 |

The resulting coating composition had a solids content of 45% and a viscosity of 18 seconds measured with a No. 2 Zahn cup.

The coating composition was sprayed onto a primed metal panel coated with a pigmented water borne acrylic lacquer. The coating was baked for 30 minutes at 71° C. The resulting finish was about 2 mils thick, had a gloss measured at 20° of 85 and had a general appearance which was rated as excellent. The hardness of the finish was 3.5 knoops and after 7 days the hardness was 6.5 knoops.

I claim:

1. A coating composition comprising 20-80% by weight of reactive binder components and 80-20% by weight of an organic liquid carrier; wherein the binder consists essentially of about
    (a) 50-95% by weight, based on the weight of the binder, of an acrylic polymer having at least two reactive anhydride groups and consists of polymerized monomers of an ethlenically unsaturated anhydride and polymerized monomers selected from the group consisting of alkyl methacrylate, alkyl acrylate and any mixtures thereof, wherein the alkyl groups having 1-8 carbon atoms and the polymer has a weight average molecular weight of about 2,000-50,000;
    (b) 5-50% by weight, based on the weight of the binder, of a glycidyl component having at least two reactive glycidyl groups; and
    (c) about 0.1-5% by weight, based on the weight of the binder, of triethylene diamine;
wherein the primary reaction on curing of the composition occurs between the anhydride groups of the acrylic polymer and the glycidyl groups of the glycidyl component and wherein the composition upon curing forms a hard, glossy and tack free finish.

2. The coating composition of claim 1 in which the glycidyl component is selected from the group consisting of polyglycidyl ether of low molecular weight polyol, low molecular weight epoxy resins, polyglycidyl ester of polyacids, polyglycidyl ethers of isocyanurates, glycidyl methacrylate or gylcidyl acrylate containing acrylic polymers or compatible mixture of any of the above.

3. The coating composition of claim 1 in which the acrylic polymer contains about 0.1-50% by weight of monomers selected from the group consisting of styrene, acrylonitrile, methacrylonitrile and any mixtures thereof.

4. The coating composition of claim 1 in which the acrylic polymer has a glass transition temperature of 0° to 70° C. and a weight average molecular weight of about 4,000-25,000.

5. The coating composition of claim 4 in which the acrylic polymer consists essentially of 20-40% by weight, based on the weight of the acrylic polymer of methyl methacrylate, styrene or mixture of methyl methacrylate and styrene, 35-55% by weight of an alkyl methacrylate or an alkyl acrylate having 2-4 carbon atoms in the alkyl group and 5-55% by weight of polymerizable ethylenically unsaturated anhydride.

6. The coating composition of claim 5 in which the glycidyl component comprises a polyglycidyl ether of a polyol.

7. The coating composition of claim 6 in which the acrylic polymer consists of polymerized monomers of methyl methacrylate, butyl acrylate and itaconic anhydride.

8. The coating composition of claim 6 in which the acrylic polymer consists of polymerized monomers of butyl acrylate, styrene, maleic anhydride and maleic acid.

9. The coating composition of claim 4 in which the acrylic polymer consists essentially of polymerized monomers of methyl methacrylate, styrene, butyl acrylate and itaconic anhydride;

10. The coating composition of claim 4 in which the acrylic polymer consists essentially of polymerized monomers of butyl acrylate, styrene, maleic anhydride and maleic acid, and
the glycidyl component consists essentially of sorbitol polyglycidyl ether.

11. The coating composition of claim 1 containing about 0.1-50% by weight, based on the weight of the binder, of pigment.

12. The coating composition of claim 1 in which the acrylic polymer contains up to about 40% by weight by polymerized monomers alkyl acrylate, alkyl methacrylate or mixtures thereof having 9-12 carbon atoms in the alkyl groups.

13. A coating composition comprising 20-80% by weight of reactive binder components and 80-20% be weight of an organic liquid carrier; wherein the binder consists essentially of about
(a) 50-95% by weight, based on the weight of the binder, of an acrylic polymer having at lest two reactive anhydride groups and consists of polymerized monomers of an ethylenically unsaturated anhydride and polymerized monomers selected from the group consisting of alkyl methacrylate, alkyl acrylate and any mixtures thereof, wherein the alkyl groups have 1-8 carbon atoms and the polymer has a weight average molecular weight of about 2,000-50,000;
(b) 5-50% by weight, based on the weight of the binder, of a glycidyl component having at least two reactive glycidyl groups consisting essentially of a polymer of polymerized glycidyl acrylate or glycidyl methacrylate and an alkyl methacrylate, an alkyl acrylate or mixtures thereof in which the alkyl group has 1-12 carbon atoms and having a weight average molecular weight of about 2,000-20,000; and
(c) about 0.1-5% by weight, based on the weight of the binder, of triethylene diamine;
wherein the primary reaction on curing of the composition occurs between the anhydride groups of the acrylic polymer and the glycidyl groups of the glycidyl component and wherein the composition upon curing forms a hard, glossy and tack free finish.

14. The coating composition of claim 13 in which the glycidyl component consists essentially of a polymer of 30-70% by weight of glycidyl methacrylate or glycidyl acrylate and 70-30% by weight of an alkyl acrylate or methacrylate having 1-4 carbon atoms in the alkyl group.

15. The coating composition of claim 14 in which the glycidyl component contains about 50-70% by weight glycidyl methacrylate and 30-50% by weight butyl methacrylate and has a weight average molecular weight of about 5,000-10,000.

16. The coating composition of claim 15 in which the acrylic polymer consists essentially of
20-50% by weight, based on the weight of the acrylic polymer of methyl methacrylate, styrene or mixture of methyl methacrylate and styrene, 35-55% by weight of an alkyl methacrylate or an alkyl acrylate having 2-4 carbon atoms in the alkyl group and 5-55% by weight of polymerizable ethylenically unsaturated anhydride.

17. The coating composition of claim 16 in which the acrylic polymer consists of polymerized monomers of methyl methacrylate, butyl acrylate and itaconic anhydride.

18. The coating composition of claim 16 in which the acrylic polymer consists of polymerized monomers of butyl acrylate, styrene, maleic anhydride and maleic acid.

* * * * *